(12) United States Patent
De Roovere

(10) Patent No.: US 11,701,702 B2
(45) Date of Patent: Jul. 18, 2023

(54) MACHINE AND METHOD FOR THE ASSEMBLY OF PROFILES

(71) Applicant: Aluro NV, Heist-op-den-berg (BE)

(72) Inventor: Peter De Roovere, Heist-op-den-berg (BE)

(73) Assignee: ALURO NV, Heist-Op-Den-Berg (BE)

( * ) Notice: Subject to any disclaimer, the term of this patent is extended or adjusted under 35 U.S.C. 154(b) by 550 days.

(21) Appl. No.: 15/776,504

(22) PCT Filed: Nov. 18, 2016

(86) PCT No.: PCT/IB2016/056968
§ 371 (c)(1),
(2) Date: May 16, 2018

(87) PCT Pub. No.: WO2017/085684
PCT Pub. Date: May 26, 2017

(65) Prior Publication Data
US 2018/0333763 A1    Nov. 22, 2018

(30) Foreign Application Priority Data

Nov. 20, 2015   (BE) .................................. 2015/5760

(51) Int. Cl.
| | | |
|---|---|---|
| *B21D 53/00* | (2006.01) | |
| *B21D 53/74* | (2006.01) | |
| *B21D 47/04* | (2006.01) | |
| *B23P 11/00* | (2006.01) | |
| *B21D 39/00* | (2006.01) | |
| *B21D 39/02* | (2006.01) | |
| *E06B 3/273* | (2006.01) | |

(52) U.S. Cl.
CPC ............. *B21D 53/74* (2013.01); *B21D 39/00* (2013.01); *B21D 39/023* (2013.01); *B21D 47/04* (2013.01); *B23P 11/005* (2013.01); *E06B 3/273* (2013.01)

(58) Field of Classification Search
CPC ....... E06B 3/273; E06B 3/2735; B21D 52/74; B21D 39/00; B21D 39/04; B21D 39/023; B21D 47/04; B21D 39/02; B21D 39/026; B21D 53/74; B21B 27/005; B23P 11/005; B23P 19/047
See application file for complete search history.

(56) References Cited

U.S. PATENT DOCUMENTS

2011/0119883 A1*  5/2011  Gimelshtein ......... B23P 19/047
                                                29/33 R

FOREIGN PATENT DOCUMENTS

| CN | 202325009 U | 7/2012 |
|---|---|---|
| CN | 204584119 U | 8/2015 |
| | (Continued) | |

*Primary Examiner* — Debra M Sullivan
(74) *Attorney, Agent, or Firm* — Cermak Nakajima & McGowan LLP; James Creighton Wray

(57) ABSTRACT

Machine (1) for the assembly of profiles (2) formed of at least a first profile section (3) and a second profile section (4) connected by means of one or several thermally insulating sections (5,6), whereby the machine (1) is provided with press means (58) exerting an adjustable pressure on press tools (48) in a lateral direction (HH') and towards the profile sections (3,4) to be assembled so as to be able to exert an adjustable force on corresponding walls (18) of grooves (17, 20, 31, 33, 82, 90) of the profile sections (3,4) in order to achieve a plastic deformation thereof.

11 Claims, 7 Drawing Sheets

(56) References Cited

FOREIGN PATENT DOCUMENTS

| CN | 104895455 | A | | 9/2015 | | |
|----|-----------|------|---|--------|---|---------|
| EP | 0260224 | A1 | * | 3/1988 | ............. | E06B 3/273 |
| EP | 0260224 | A1 | | 3/1988 | | |
| EP | 0311850 | A2 | | 4/1989 | | |
| EP | 1949982 | A2 | | 7/2008 | | |
| EP | 1949982 | B1 | * | 7/2012 | ............. | B21D 53/74 |

* cited by examiner

MACHINE AND METHOD FOR THE ASSEMBLY OF PROFILES

This application claims the benefit of Belgian Application No. 2015/5760 filed Nov. 20, 2015 and PCT/IB2016/056968 filed Nov. 18, 2016, International Publication No. WO 2017/085684, which are hereby incorporated by reference in their entirety as if fully set forth herein.

The present invention first of all concerns a machine for the assembly of profiles.

In particular, the invention concerns a machine for the assembly of profiles which are formed of at least a first profile section and a second profile section, also called half-shells, which are connected by means of one or several thermally insulating sections, better known in the art under the name intermediate sections.

The edges of the thermally insulating sections or intermediate sections are hereby provided in grooves of the profile sections.

The edges of the intermediate sections usually have the shape of a dovetail which can be provided with some play in the grooves of the half-shells, which grooves also have the shape of a dovetail.

A machine to which the invention relates is provided to this end with one or several press tools or roller tools which can intervene at the grooves of the profile sections in order to plastically deform one or several walls of the grooves by means of pressing or rolling and to clamp the thermally insulating sections in the grooves.

Often, one wall of an aforesaid groove, usually the wall of the groove situated more towards the inside of the profile section, is made less deformable, whereas the opposite wall of the same groove, which usually forms an outer contour of the profile section, is more easily deformable and is intended to be pressed down by means of a press tool or roller tool.

Thus is obtained a connection between the profile sections.

Without limiting the invention thereto, the profiles which can be assembled with a machine according to the invention can be typically used for example as profiles for windows, doors or the like.

The profile sections or half-shells are hereby typically made of a metal such as for example aluminium, steel or stainless steel by means of extrusion.

The thermally insulating sections or intermediate sections are made of a plastic to form a thermally insulating bridge between the thermally highly conductive metal profile sections.

The intermediate sections are usually made of glass fibre-reinforced polyamide.

A minority of the intermediate sections is made of glass fibre-reinforced PVC, and for fire-resistant applications, also intermediate sections made of polyester are used.

In this manner is avoided that window profiles might form a thermal bridge between the space inside a house and the outside air.

Machines for the assembly of such profiles are already known, but they have a number of disadvantages.

With the known machines of the type referred to, the plastic deformation of the grooves is achieved by keeping the press tools at a certain lateral distance from the central axis of the profile sections, or by moving them over said distance which is smaller than the lateral distance between the outer contours of these profile sections at the position of the grooves and this central axis.

Thus, the profile sections will be required to deform when the press tools and the profile sections are moved in relation to one another in the longitudinal direction.

Such a type of machine is known for example from EP1949982.

The machine described in EP1949982 is hereby provided with means to adjust the axes of the press tools, horizontally as well as vertically, and as a function of the profile to be deformed.

During the pressure operation itself, the press tools are kept at a fixed distance from the central axis, however.

A first major disadvantage of this known type of machines is that, due to possible local tolerance differences over the length of the profile sections, an irregular plastic deformation of the grooves is obtained over the length of the profile to be assembled.

In other words, the edges of the thermally insulating profiles will be clamped between the deformed walls of the grooves to a greater or lesser extent depending on the position on the profile.

The force exerted during the plastic deformation of the edges of the grooves is hereby not always equal either.

This is disadvantageous since the strength of the permanent connection between a profile section and an edge of a thermally insulating section is not only determined by the degree of deformation of the edges of the grooves, but also by the force exerted on these edges.

Of course, the aim is to obtain a connection between the profile sections and the thermally insulating sections of a quality that is as constant as possible, over the entire length of an assembled profile as well as with successive profile assemblies.

The quality of the connection is subjected to standardized minimum requirements and is measured in shear (T-value) and pull-out value (Q-value).

With some known machines for the assembly of profiles of the type concerned, sensors such as piezo-electric sensors are provided on the machine, with which the force exerted during the operation can be measured.

Such a machine is also known for example from P1949982.

On the basis of this measurement of the forces, the lateral position of the press tools can be adjusted if this proves necessary.

It is clear that this is a very indirect method by which the correct lateral position of the press tools can only be set by trial and error.

This is not only disadvantageous in that it requires much time to set the machine, but also in that a lot of material may get lost before the correct setting is obtained.

Moreover, a certain setting of the press tools is not necessarily the correct setting for the assembly of all profile sections of a particular batch to be assembled, given possible tolerance differences between the profile sections of this batch.

Such tolerance differences are typically small local differences in the shape of the profile sections, due to manufacturing conditions in the extrusion process of the profile sections, and within acceptable limits as defined in standards such as the standard EN NORM 12020-2 or similar tolerance standards.

Not being able to compensate tolerance differences often leads to warping of the profiles and other quality problems.

Another disadvantage of the known machines for the assembly of profiles of the type concerned is that, for the assembly of a very diverse number of types of profiles, many adapted tools are required.

Usually, there are many restrictions as far as the width, height as well as the shape of the profile sections is concerned, the shape and orientation of the grooves in these profile sections, the shape and size of the thermally insulating sections with which these profile sections are coupled to one another, as well as the number of profile sections and intermediate thermal sections that can be applied in a profile.

The lack of possibilities to overcome tolerance differences with the known machines hereby again leads to quality problems with the realised connections.

Another major disadvantage of the known machines is that setting them is usually complicated, requires well-developed skill and is often time-consuming, as a result of which the productivity of such machines is rather low, especially with smaller batches to assemble.

All the above also has consequences for the cost price of the assembly.

Also, the present invention aims to remedy one or several of the above-mentioned and possibly also other disadvantages.

In particular, the invention aims to offer a machine for the assembly of profiles which makes it possible to assemble many different types of profiles in a simple manner and preferably as automated as possible, requiring no or practically no expert skill of the operators of the machine.

Another aim of the invention is to obtain a machine for the assembly of profiles which can cope with tolerance differences in profile sections of the profile to be assembled in a flexible and fully automated manner.

To this aim, the present invention concerns a machine for the assembly of profiles according to the preamble of claim 1, and whereby the machine is provided with at least one pair of press tools provided on either side of a profile section to be assembled, whereby both press tools of such a pair of press tools are moreover arranged such that they can move in a lateral direction at right angles to the longitudinal direction of a profile to be formed during the pressure or rolling operation, and whereby the machine is provided with press means exerting an adjustable pressure on the press tools concerned of at least one such pair of press tools on either side of a profile section to be assembled in the above-mentioned lateral direction and towards the profile sections to be assembled so as to be able to exert an adjustable force on the corresponding walls of the grooves.

A major advantage of such a machine according to the invention is that the plastic deformation of one or several walls of the grooves in the profile sections takes place under the influence of an adjustable and controllable force, so that a uniform quality of the connection between the profile sections and the thermally insulating sections can be obtained over the length of the profile sections, regardless of any possible local differences, at least within certain tolerance limits, in the shape of the grooves.

The fact that a machine according to the invention is such that walls of the grooves of the profile sections are plastically deformed on the basis of a predetermined force and not on the basis of the distance at which said wall is situated in relation to a reference position or reference plane or the like, indeed allows local differences in profile sections to be easily overcome.

For clarity's sake, these tolerance limits are typically of an order of magnitude expressed in tenths of a millimetre and not in millimetres, but they have a significant impact on the quality and durability of the connection.

In order to enable force-controlled deformation of the walls, it is necessary for the press tools or roller tools concerned to be arranged such that they can move in a lateral direction at right angles to the longitudinal direction of a profile to be formed during the pressure or rolling operation, which is also a characteristic of the invention.

Indeed, arranging the press tools or roller tools at a fixed lateral distance during the operation comes down to the method which is applied in the known machines and implies that small deviations in the profile sections at the grooves inevitably involve a larger or smaller force being applied.

In a machine according to the invention there is at least one pair of press tools provided on either side of a profile section to be assembled, whereby both press tools of such a pair of press tools are moreover arranged such that they can move in a lateral direction at right angles to the longitudinal direction of the profile to be formed during the pressure or rolling operation.

The fact that the press tools are arranged such that they can move on either side of the profile or profile section to be formed and are energized by means of press means with an adjustable force has very positive effects on the quality of the assembly.

Indeed, a result of arranging the press tools or roller tools such that they can move during the pressure operation or the rolling operation is among others that a very dynamic arrangement is obtained, whereby the press tools automatically reposition themselves during the assembly of a profile as a function of the local and momentary shape of the section of the profile sections which is being presented to the press tool concerned at the moment of contact.

Additionally, such a movable arrangement of the press tools or roller tools is advantageous in that setting a machine according to the invention as a function of a batch of profiles of a certain type to be assembled can be done very smoothly and can be easily automated.

According to a preferred embodiment of a machine according to the invention, the press means are of the hydraulic, pneumatic or electric type or a combination thereof.

Press means of the hydraulic type are particularly advantageous in that very large forces can be developed on the walls of the grooves of the profile sections to be deformed, and moreover in a very precise manner.

Forces required for pressing on the profile sections and for deforming the walls of the grooves therein can hereby be readily applied.

Such a pressing force typically amounts to some 5000 N and the required roll-in forces may vary between 2000 N and 3500 N.

In a preferred embodiment of a machine according to the invention, the press means make it possible to set the force for plastically deforming the walls of the grooves of the first profile section irrespective of the force for deforming the walls of the grooves of the second profile section.

Such an embodiment of a machine according to the invention is particularly interesting since the grooves in the first profile section do not necessarily have the same shape as the grooves in the second profile section, whereby, as a consequence, the force required for the deformation of the respective grooves must not necessarily be the same.

With the known machines there is no force-controlled control of the plastic deformation of the grooves, and certainly no force-controlled control of the plastic deformation of the grooves which is adjustable independently from one another.

According to yet another preferred embodiment of a machine according to the invention, the adjustable force is such that a constant force is continuously exerted on the respective walls of the grooves during the processing of a profile, irrespective of small deviations in the shape of the profile sections due to differences within certain tolerance limits while they are being manufactured.

Such an embodiment of a machine according to the invention is perfect for achieving a constant quality of the connection of the profile sections.

In a possible embodiment of a machine according to the invention whereby such a constant, adjustable force is realised, use is made of a hydraulic system with switching means which contain one or several proportional valves.

In yet another preferred embodiment of a machine according to the invention, the machine is provided with roughening means with which the grooves in the profile sections can be roughened.

Such roughening of the grooves, and in particular of the inner sides of such a groove, is meant to increase the grip between the clamped thermally insulating section and the metal profile sections after they have been clamped by the plastic deformation of the walls of the grooves by means of the press tools.

Additionally, a machine according to the invention is preferably provided with one or several carriers or pusher elements by means of which thermally insulating sections can be inserted in the grooves.

A machine in which the roughening means as well as said carriers or pusher elements are included makes it possible to combine several operations at once, more specifically the roughening, the insertion of the thermally insulated sections and their clamping in the profile sections.

In a preferred embodiment of a machine according to the invention, the press tools, the roughening means and/or the carriers or pusher elements are provided on one or several trolleys which can be moved to and fro or along the profile sections to be assembled, whereby during a forward movement of the trolley or trolleys, the grooves are roughened first and the thermally insulating sections are provided in the grooves, and during a return movement of the trolley or trolleys, the grooves are plastically deformed by means of the press tools so as to connect the profile sections.

Such a machine according to the invention combines three essential operations for the assembly of the desired profiles in a single forward and return movement of the trolley or trolleys, which results in a very high productivity and also in assembled profiles of a very high and constant quality.

The invention also concerns a method for the assembly of profiles whereby at least a first profile section and a second profile section are connected by means of one or several thermally insulating sections, whereby edges of the thermally insulating sections are provided in grooves of the profile sections and whereby the method is characteristic in that at least one pair of press tools is provided on either side of a profile section to be assembled, whereby moreover both press tools of such a pair of press tools are arranged such that they can move in a lateral direction at right angles to the longitudinal direction of a profile to be formed during the pressure or rolling operation, and whereby an adjustable pressure is exerted on the press tools concerned of at least one such pair of press tools by means of press means, whereby an adjustable and controllable force is exerted on the press tools concerned at the height of the grooves of the profile sections so as to plastically deform one or several walls of the grooves and to achieve a clamping of the thermally insulating sections in the grooves, and thus a connection between the profile sections.

It is clear that such a method offers all the advantages described above with reference to the machine according to the invention, but more generally touches the core of the invention, which is to achieve a deformation on the basis of a driven and controlled force.

In a preferred method according to the invention, the tools are moved over the length of the profile sections to be assembled, whereby in a forward movement, the grooves in profile sections will be roughened, and in that same forward movement, the thermally insulating sections will be provided in the grooves, whereas during the return movement, the adjustable and controlled force will be exerted at the height of the grooves in order to achieve the above-mentioned plastic deformation.

In order to better explain the characteristics of the invention, the following preferred embodiments of a machine and method for the assembly of profiles will be described as an example only without being limitative in any way, with reference to the accompanying figures, in which:

DETAILED DESCRIPTION

Figure 1:
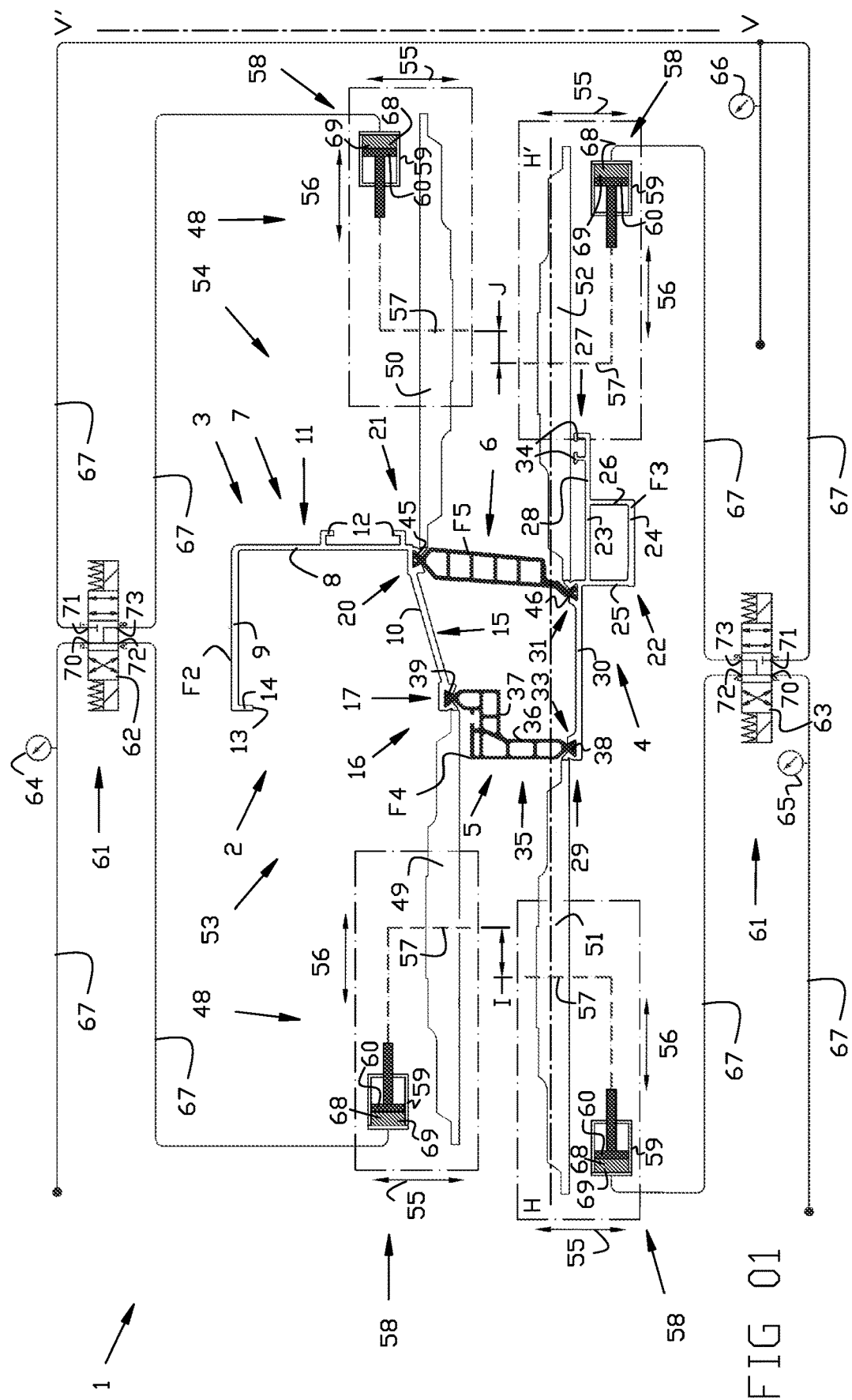
FIG. 1 schematically illustrates sections of a first embodiment of a machine according to the invention, seen as a section.

The sections of a machine 1 according to the invention represented in FIG. 1 are merely meant to illustrate the operation of a machine 1 according to the invention and must not be regarded as a realistic representation.

Figure 2:
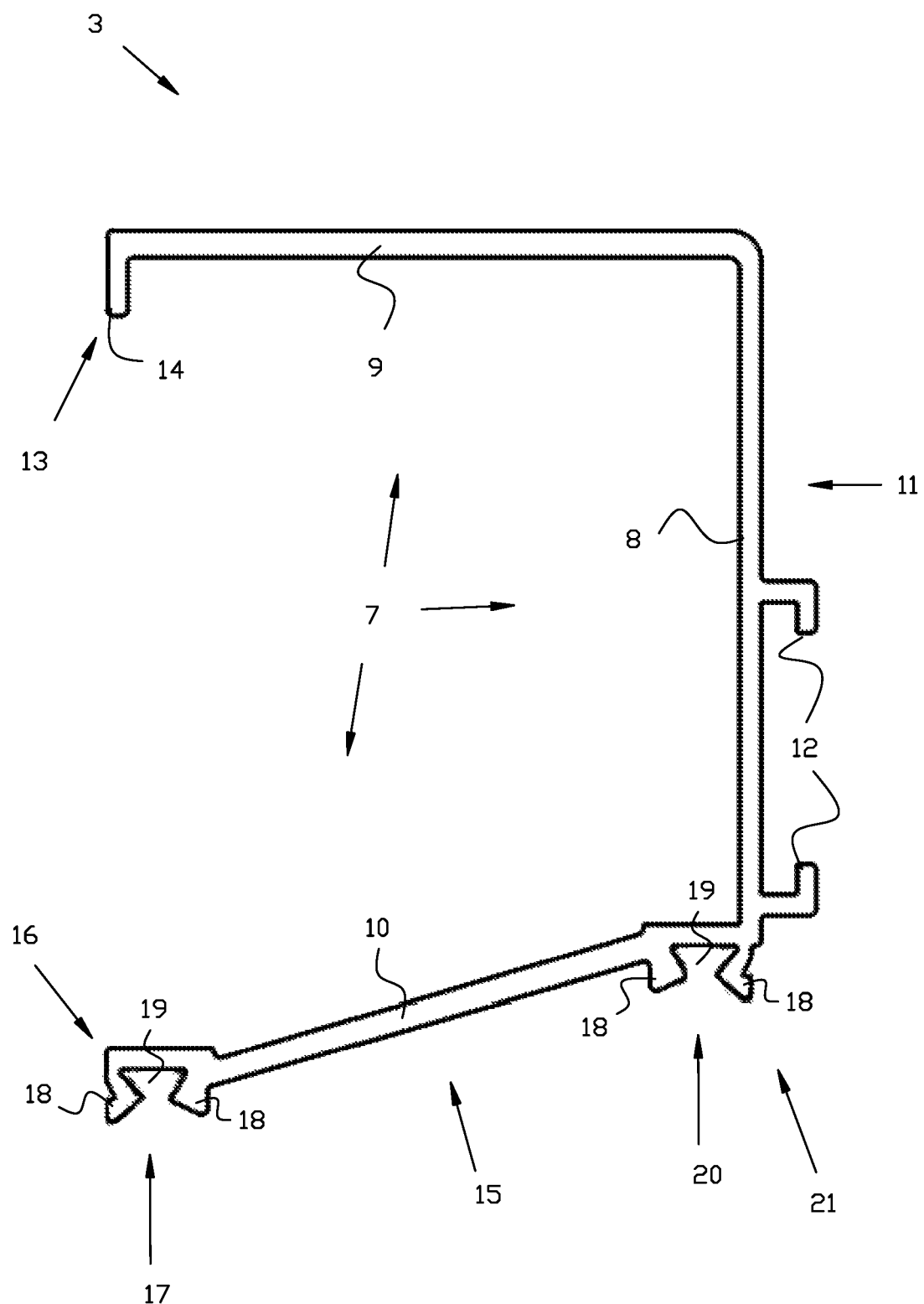
FIGS. 2 to 5 represent the sections from FIG. 1 to a larger scale, indicated respectively by F2 to F5; and, FIGS. 6 and 7 illustrate other embodiments of a machine according to the invention in a similar manner as in FIG. 1.
Figure 3:
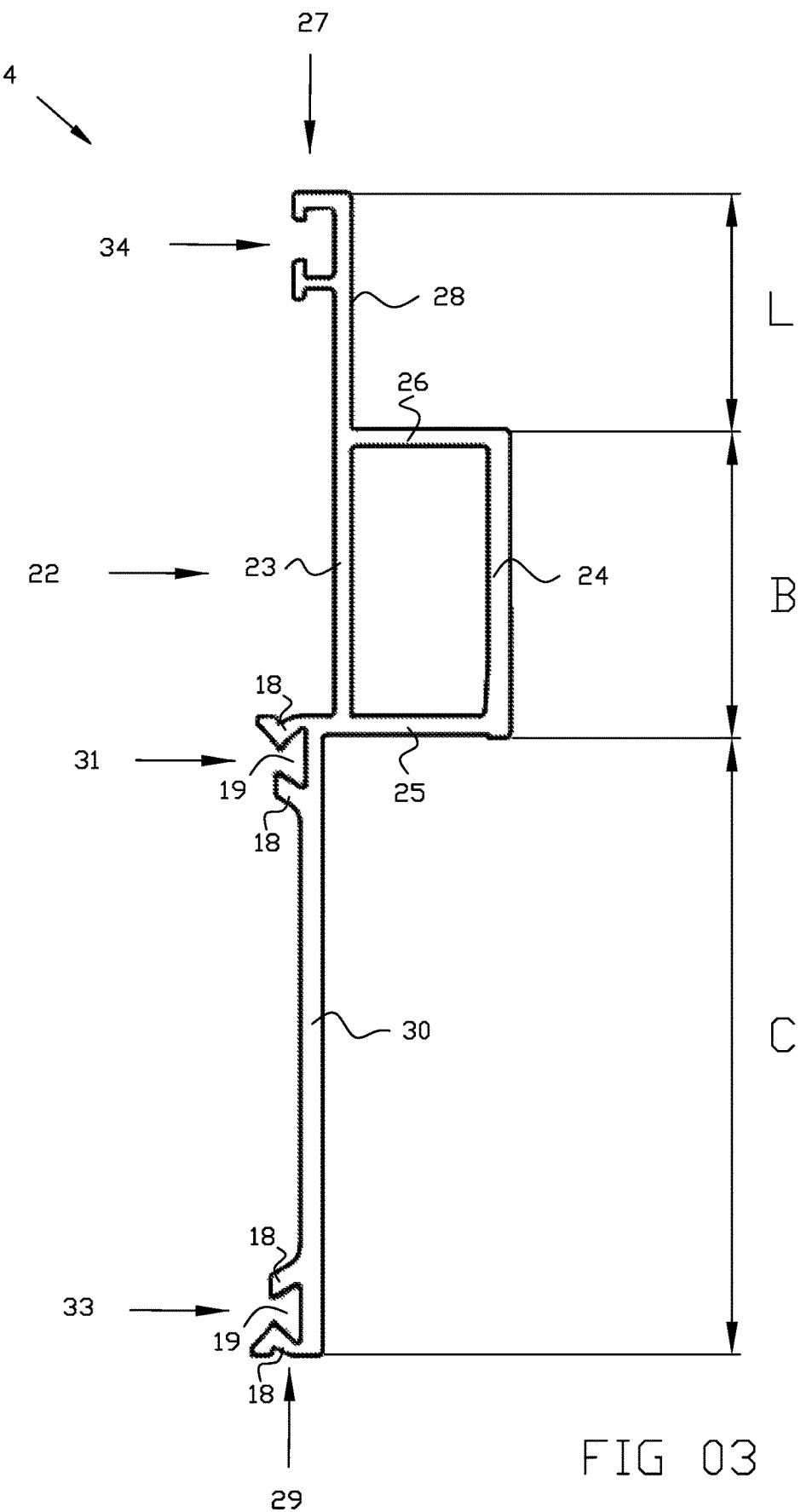

The machine 1 is meant for the assembly of longitudinal profiles 2, represented in cross-section in the figures and comprising at least a first profile section 3 or half-shell 3, represented to a larger scale in FIG. 2, as well as a second profile section 4 or half-shell 4, represented to a larger scale in FIG. 3.

Figure 4:
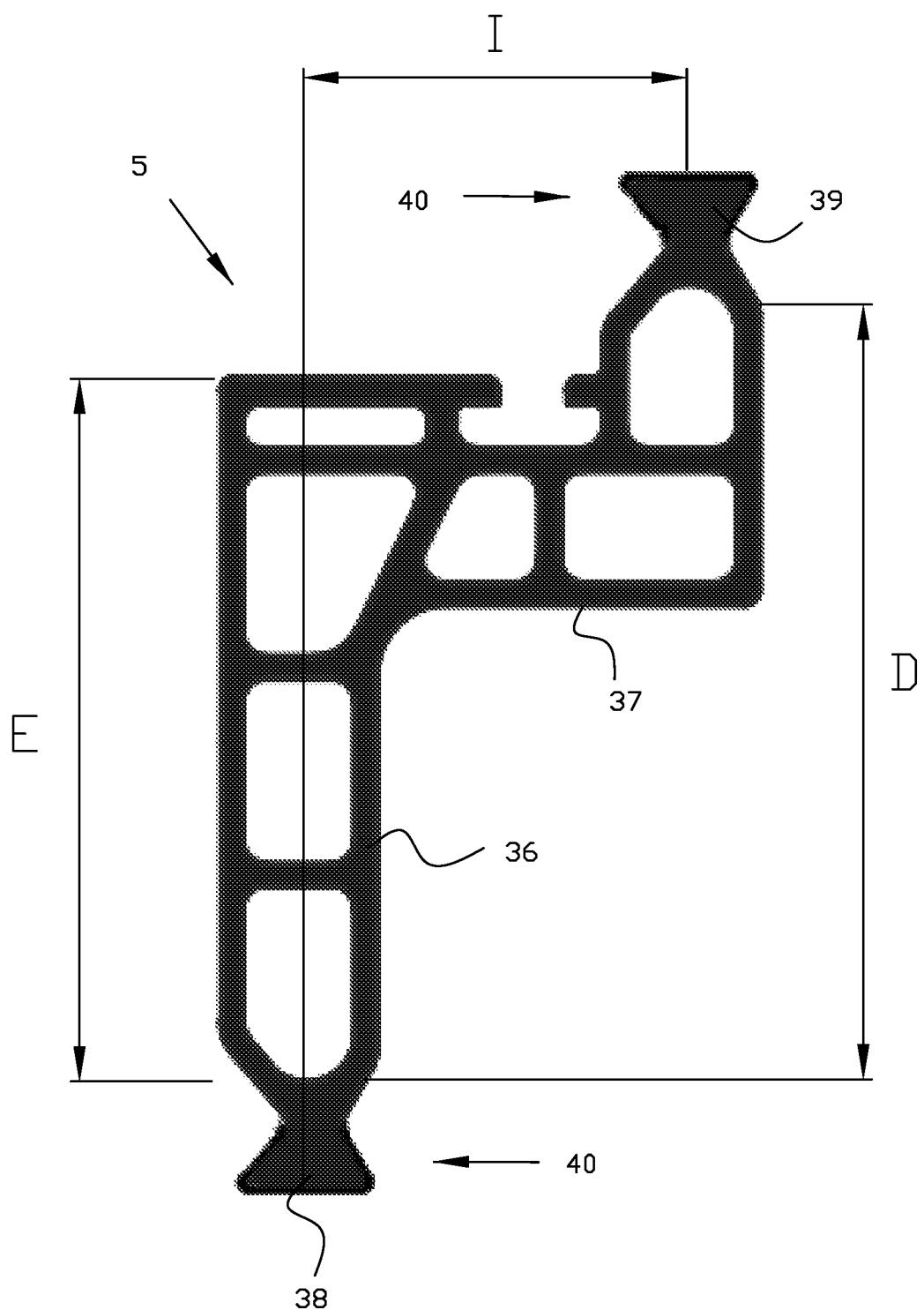
Figure 5:
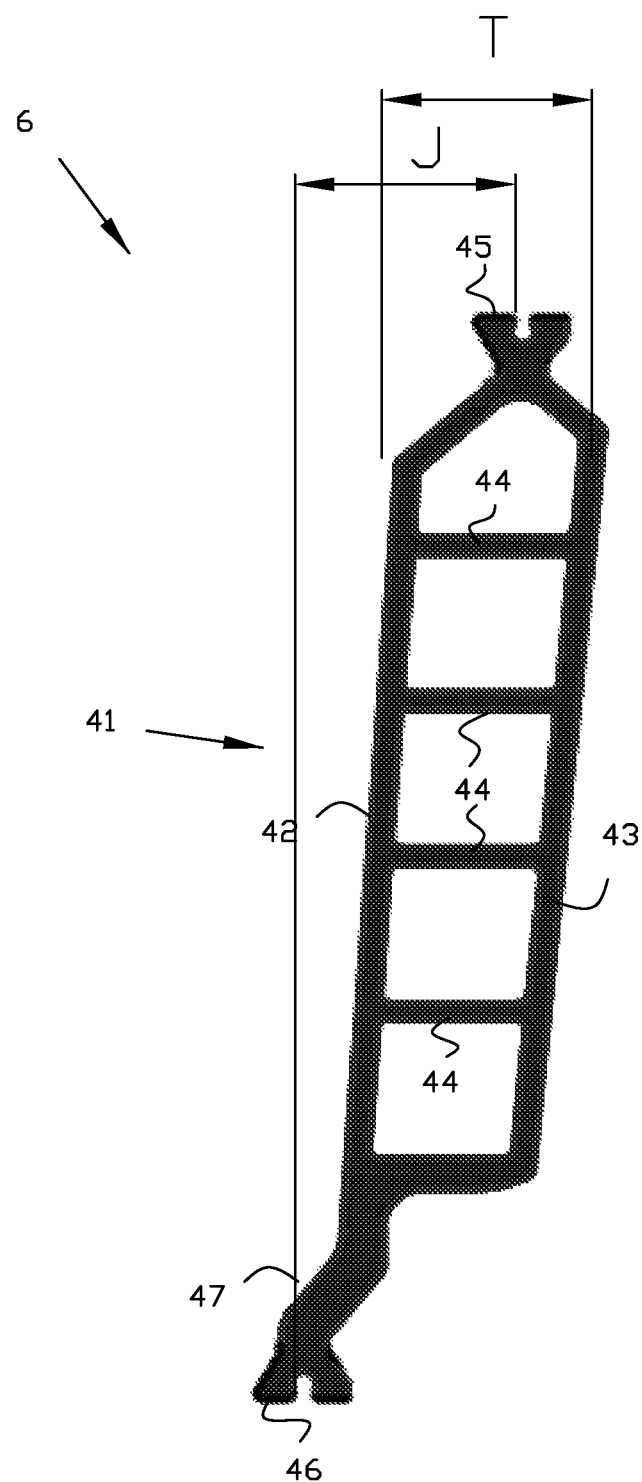

In the case of FIG. 1, the first profile section 3 and the second profile section 4 are connected by means of a pair of thermally insulating sections or intermediate sections 5 and 6, represented respectively in FIGS. 4 and 5.

The first profile section 3 is an extruded, metal profile section 3 having a more or less U-shaped section 7 formed by a rib 8 and two side panels, more specifically a first side panel 9 and a second side panel 10.

The second side panel 10 stands somewhat slantingly outwards with regard to the perpendicular position on the rib 8, whereas the other side panel 9 is perpendicular to the rib 8.

On the outer side 11 of the rib 8 of the first profile section 3 is provided a pair of hook-shaped edges 12 facing each other.

The free side edge 13 of the first side panel 9 is provided with an inwardly directed right-angled tooth 14. On the outer side 15 of the second side panel 10 at the height of the free side edge 16 is provided a groove 17, formed by two walls 18 which together define an opening whose profile has the shape of a dovetail 19.

The groove 17 extends over the length of the first profile section 3.

A similar groove 20 with an opening in the shape of a dovetail 19 is provided on the outer side 15 of the second side panel 10 on the other side edge 21 at the corner joint with the rib 8.

The second profile section 4 is also an extruded, metal profile section 4 with a tubular body 22 having a rectangular section, formed of an upper surface 23 and a lower surface 24 which are connected by two side surfaces 25 and 26.

The upper surface 23 extends on one side 27 over the relevant side surface 26 with approximately a length L in accordance with the width B of the tubular body 21 so as to form a first wing 28.

On the opposite side 29 is provided a similar second wing 30 which is parallel to the upper surface 23 but slightly offset from that upper surface 23 and which has a width C which corresponds approximately to the width B+L of the upper surface 23 and the first wing 28 together.

At the height of the connection between this second wing 30 and the upper surface 23 is provided a groove 31 having the profile of a dovetail 19 which extends over the length of the second profile section 4.

On the free side edge 32 of the second wing 30 is provided a similar groove 33.

On the first wing 28 are further also provided a number of hook-shaped edges 34.

The metal profile sections 3 and 4 must be connected by means of the thermally insulating sections 5 and 6 by means of the machine 1 so as to form a thermally insulating rib 35.

The thermally insulating sections 5 and 6 are made of a synthetic material.

The first thermally insulating section 5 has the shape of an angular profile 5 or L-profile 5, formed by two legs 36 and 37 that are perpendicular to each other.

The angular profile 5 has a honeycomb inner structure.

On either side of the angular profile 5 is each time provided an edge 38 and 39 which extends over the length of the angular profile 5.

These edges 38 and 39 each have the shape of a dovetail 40 which is complementary to the shape of the grooves 17, 20, 31 and 33 in the profile sections 3 and 4.

The edge 38 extends in the extension of the leg 36, whereas the edge 39 stands at right angles to the other leg 37, so that both edges 38 and 39 extend in the same direction parallel to the leg 36 and parallel to one another at a distance D from one another, corresponding approximately to the width E of the leg 36.

The other thermally insulating section 6 is formed of a flat profile 6, also with a comb-shaped inner structure 41 which mainly consists of two side surfaces 42 and 43 which are mutually connected by means of a number of partitions 44.

On two opposite sides of the thermally insulating section 6 is each time provided an edge, more specifically edges and 46 extending over the length of the thermally insulating section 6.

These edges 45 and 46 also have a shape which is such that they fit in the grooves 17, 20, 31 and 33 in the profile sections 3 and 4.

The first edge 45 is provided directly on the comb-shaped structure 41 at the centre of the thickness T of the thermally insulating section 6, whereas the second edge 46 is formed on a section 47 of the side surface 42 extending laterally as of the comb-shaped structure 41 in an oblique direction.

The aim is to provide the edges 38, 39, 45 and 46 of the thermally insulating sections 5 and 6 in the grooves of the profile sections 3 and 4, more specifically in this case in the grooves 33, 17, 20 and 31 respectively, and to clamp them therein by deformation of at least one of the walls 18 of the grooves 33, 17, 20 and 31 concerned.

To this end, the machine 1 according to the invention is provided with a number of press tools 48 which can intervene at the grooves 33, 17, 20 and 31 of the profile sections 3 and 4 in order to plastically deform the walls 18 of the grooves 33, 17, 20 and 31 by means of pressing or rolling, and to achieve a clamping of the thermally insulating sections 5 and 6 in the grooves 33, 17, 20 and 31, and thus a connection between the profile sections 3 and 4.

More specifically, the most outwardly directed walls 18 of the grooves 33, 17, 20 and 31 which are put into contact with the press tools 48 are plastically deformed under the influence thereof.

The more inwardly directed walls 18 of the grooves 33, 17, 20 and 31 which do not make contact with the press tools 48 serve as a support during the deformation and undergo no significant plastic deformation.

In the arrangement of the machine 1 according to the invention, as represented in FIG. 1, the press tools 48 consist of pressure discs 49 to 52.

FIG. 1 represents only four pressure discs 49 to 52, but it is not excluded according to the invention to arrange several such groups of pressure discs 49 to 52 next to one another in the length of the profile 2 to be assembled.

These pressure discs 49 to 52 are arranged in pairs on either side 53 and 54 of the profile sections 3 and 4 to be assembled.

It is even so that, in general, the pressure discs 49 and 50 of a first pair of press tools 48 are situated opposite one another on two opposite sides 53 and 54 of the first profile section 3 of the profile 2 to be assembled, whereas the pressure discs 51 and 52 of a second pair of press tools 48 are placed at a certain distance therefrom according to the longitudinal direction of the profile 2 to be formed, also on opposite sides 53 and 54 of the second profile section 4 of the profile 2.

More specifically, the pressure discs 49 and 50 are arranged opposite one another at the grooves 17 and 20 respectively in the first profile section 3, and the pressure discs 51 and 52 at the grooves 33 and 31 respectively in the second profile section 4.

The machine 1 is such that the height according to the vertical direction VV' of each of the pressure discs 49 to can be set separately and independently from one another, which is symbolically represented by the arrows 55.

In the case of FIG. 1, the pressure discs 51 and 52 are thus arranged in the same horizontal plane HH', since the grooves 31 and 33 are provided on the horizontally extending second wing 30.

On the other hand, the pressure discs 48 and 49 are somewhat offset in relation to one another in the vertical direction VV', in accordance with the inclined position of the side panel 10 on which the grooves 17 and 20 are provided.

Setting the height of the pressure discs 49 to 52 in the vertical direction VV' can be done for example by means of automated control means, whereby, on the basis of data regarding the profile sections 3 and 4 to be assembled and thermally insulating sections 5 and 6, for example data which are supplied to the machine 1 via software, the pressure discs 49 to 52 are put in the correct vertical position VV' and are fixed or held therein before the actual pressure operation is started.

The machine 1 may for example be a CNC machine 1 which is provided with an interface with which a user can input data regarding the type of profiles 2 to be assembled so as to automatically configure the machine 1 accordingly.

The pressure discs 49 to 52 are also arranged such that they can move in a horizontal direction HH', which is represented by arrows 56.

By a moveable arrangement is meant here that the pressure discs 49 to 52 are not permanently mounted, not even during the rolling operation, as opposed to what is the case with known machines wherein the position of pressure discs can be adjusted before performing a new rolling operation, but wherein these pressure discs are fixedly arranged during the operation itself.

The horizontal direction HH' is a lateral direction HH' at right angles to the longitudinal direction of the profile to be assembled, which longitudinal direction is also situated in a horizontal plane in this case.

This makes it possible to assemble complex shapes, as is also the case in FIG. 1, wherein the grooves 17 and 33 are not situated in the same vertical plane VV'.

Consequently, the shafts 57 around which the corresponding pressure discs 49 and 51 are arranged in a rotatable manner will not extend in the same vertical plane parallel to the length of the profile 2 either, but these shafts 57 are offset in relation to one another over a given horizontal, lateral distance I which corresponds to the horizontal distance I between the edges 38 and 39 of the thermally insulating section 5.

In the same way, the shafts 57 around which the pressure discs 50 and 52 are arranged in a rotatable manner are offset in relation to one another over a horizontal, lateral distance J which is equal to the horizontal distance J between the edges 45 and 46 on the thermally insulating section 6.

Naturally, the shape of the profile 2 to be assembled as represented in FIGS. 1 to 5 is only one of many possibilities, and numerous other profiles 2 can be assembled with a machine 1 according to the invention without any problems.

According to the invention, the machine 1 is further provided with press means 58 with which an adjustable pressure can be exerted on the related press tools 48, more specifically on the shafts 57 thereof in the aforesaid lateral direction HH' and towards the profile sections 3 and 4 to be assembled so as to be able to exert an adjustable force on the corresponding walls 18 of the grooves 17, 20, 31, 33.

In the embodiments of the figures, the press means 58 are of the hydraulic type with force transmitters 59 and 60 driving the shafts 57 of the pressure discs 49 to 52, which is represented more specifically by means of cylinders 59 and pistons 59.

In the case of FIG. 1, the force transmitters 59 and 60 are hereby controlled such that the pair of pressure discs and 50 which makes contact with the first profile section 3 may be subjected to another pressure than the pair of pressure discs 51 and 52 which makes contact with the second profile section 4.

The pressure discs 49 and 50 are hereby subjected to a similar force in order to exert forces of equal size, directed towards each other respectively on the respective shafts 57 of each pair of pressure discs, such that a balanced force is exerted on both sides 53 and 54 of the profile 2 at the related walls 18.

The same applies to the pressure discs 51 and 52.

In this way is obtained a stable system, whereby both sides 53 and 54 of the profile sections 3 and 4 are subjected to equal and opposite directed forces.

These forces can be adjusted and controlled by the hydraulic system, either or not in combination with an electronic system, and of course with the intention to obtain the desired plastic deformation of the given walls 18 of the grooves 17, 20, 31 and 33 so as to be able to fix the thermally insulating portions 5 and 6.

The forces can be exerted directly on the profile sections and 4 via the pressure discs 49 to 52, but in other embodiments it is not excluded to provide the machine 1 with one or several stops against which the pressure discs 49 to 52 may possibly abut, whereby the walls 18 of the grooves 17, 20, 31 and 33 are pressed on by moving the related pressure discs 49 to 52 and the profile sections 3 and 4 in relation to one another along the stop or stops concerned.

As already explained in the introduction, however, it is important that the pressure discs 49 to 52 are arranged such that they can move in the lateral direction HH' at right angles to the longitudinal direction of a profile 2 to be formed during the pressure or rolling operation, since it thus becomes possible to deform the grooves 17, 20, 31 and 33 with an adjustable pressure force and thus obtain an assembly of a good quality, irrespective of any small differences in shape in the profile sections 3 and 4 within the acceptable tolerance limits for obtaining a certain quality.

In the embodiments described here, the press tools 48 are provided in pairs on either side of the profile sections 3 and 4 to be assembled, whereby more specifically at least two pairs of such press tools 49-50 and 51-52 are provided and whereby all these press tools 49, 50, 51, 52 are arranged such that they can move in a lateral direction HH' at right angles to the longitudinal direction of a profile 2 to be formed during the pressure or rolling operation.

In the embodiments as shown, the machine 1 is further provided with press means 58 exerting an adjustable pressure on the related press tools 48 of both pairs of press tools 49, 50 and 51, 52 in the aforesaid lateral direction HH' and towards the profile sections 3 and 4 to be assembled.

Thus, the press tools 48 can constantly position themselves in relation to the central axis of the profile 2 to be formed under the influence of the local shape of the profile sections 3 and 4, such that a very dynamic arrangement is obtained which allows to exert in particular an adjustable force on the corresponding walls 18 of the grooves 17, 20, 31, 33, 82 and 90, more particularly during the entire assembly process of said profile 2.

It is also clear that smaller deviations in the profile sections 3 and 4 can be perfectly absorbed with such a machine 1 without this having any influence on the force exerted for the assembly, and irrespective of whether such smaller deviations occur simultaneously on opposite sections on both sides 53 and 54 of the profile 2 or the profile sections 3 and 4.

In the given example of the figures, the machine 1 is provided with hydraulic switching means 61, which in this case consist of a pair of proportional valves 62 and 63.

Further, the machine 1 comprises one or several hydraulic pumps 64, 65 and 66 for supplying an outlet pressure.

By means of the proportional valves 62 and 63 can thus be achieved an adjustable outlet pressure which typically varies between 0 and 100 bar.

The maximum outlet pressure of the pumps 64 to 66 is for example typically an outlet pressure of 200 bar.

The pumps 64, 65 and 66 are connected to the chambers 68 of the force transmitters 59 by means of hydraulic lines via the switching means 61 for the supply of a hydraulic fluid 69.

More specifically, the proportional valves 62 and 63 are provided with four connections for connecting hydraulic lines 67, more specifically a pressure connection (P) 70, a tank connection (T) 71 and two cylinder connections (A and B) 72 and 73 for connections to the cylinders 59.

In the example of FIG. 1, the pressure connection 70 of each proportional valve 62 or 63 is connected to one of the pumps 64 and 65 for the supply of an adjustable outlet pressure.

The tank connection 71 of both proportional valves 62 or 63 is connected to the same hydraulic pump 66 for the supply of a maximum pressure.

The remaining cylinder connections 72 and 73 of each of the proportional valves 62 or 63 are each time connected to the chambers 68 of cylinders 69 of a pair of pressure discs arranged opposite one another on either side 63 and 64 of the profile sections 3 and 4.

More specifically, the connections 72 and 73 of the first proportional valve 62 are connected to the cylinders 69 of the pressure discs 49 and 50, whereas the connections 72 and 73 of the second proportional valve 63 are connected to the cylinders 69 of the pressure discs 51 and 52.

In the configuration of FIG. 1, both proportional valves 62 and 63 are placed in the middle position, whereby the pressure connections 70 are coupled to the connections 72 and 73 to the opposite cylinders 69, so that in this switch position, opposed press tools 48 are subjected to an identical adjustable outlet pressure.

In this case it is even so that press tools 48 on either side of the first profile section 3 are subjected to an identical pressure.

Also the press tools 48 on either side of the second profile section 4 are subjected to an identical pressure, which can be set independently from the aforesaid pressure on the first profile section 3, however.

The tank connections 71 are blocked in this switch position, so that the hydraulic pump 66 is shut off from the cylinders 69 in this arrangement.

A machine 1 according to the invention can be equipped with roughening means (not shown in the figures) with which the grooves 17, 20, 31 and 33 can be roughened, as well as with one or several carriers or pusher elements (not shown either in the figures) with which the edges 38, 39, 45 and 46 of the thermally insulating sections 5 and 6 can be pushed in the grooves 17, 20, 31 and 33.

Preferably, the press tools 48, the roughening means and/or the carriers or pusher elements are provided on one or several trolleys which can move to and fro along profile sections 3 and 4 to be assembled, and during a forward movement of the trolley or trolleys, the grooves 17, 20, 31 and 33 are roughened first and the thermally insulating sections 5 and 6 are provided in the grooves, whereas during a return movement of the trolley or trolleys the grooves 17, 20, 31 and 33 are plastically deformed by the press tools 48 so as to connect the profile sections 3 and 4 by means of the thermally insulating sections 5 and 6.

The machine 1 can also be equipped with all sorts of gripping means for temporarily holding profile sections 3 and 4 and thermally insulating sections 5 and 6 on the machine 1 during its operation.

Figure 6:
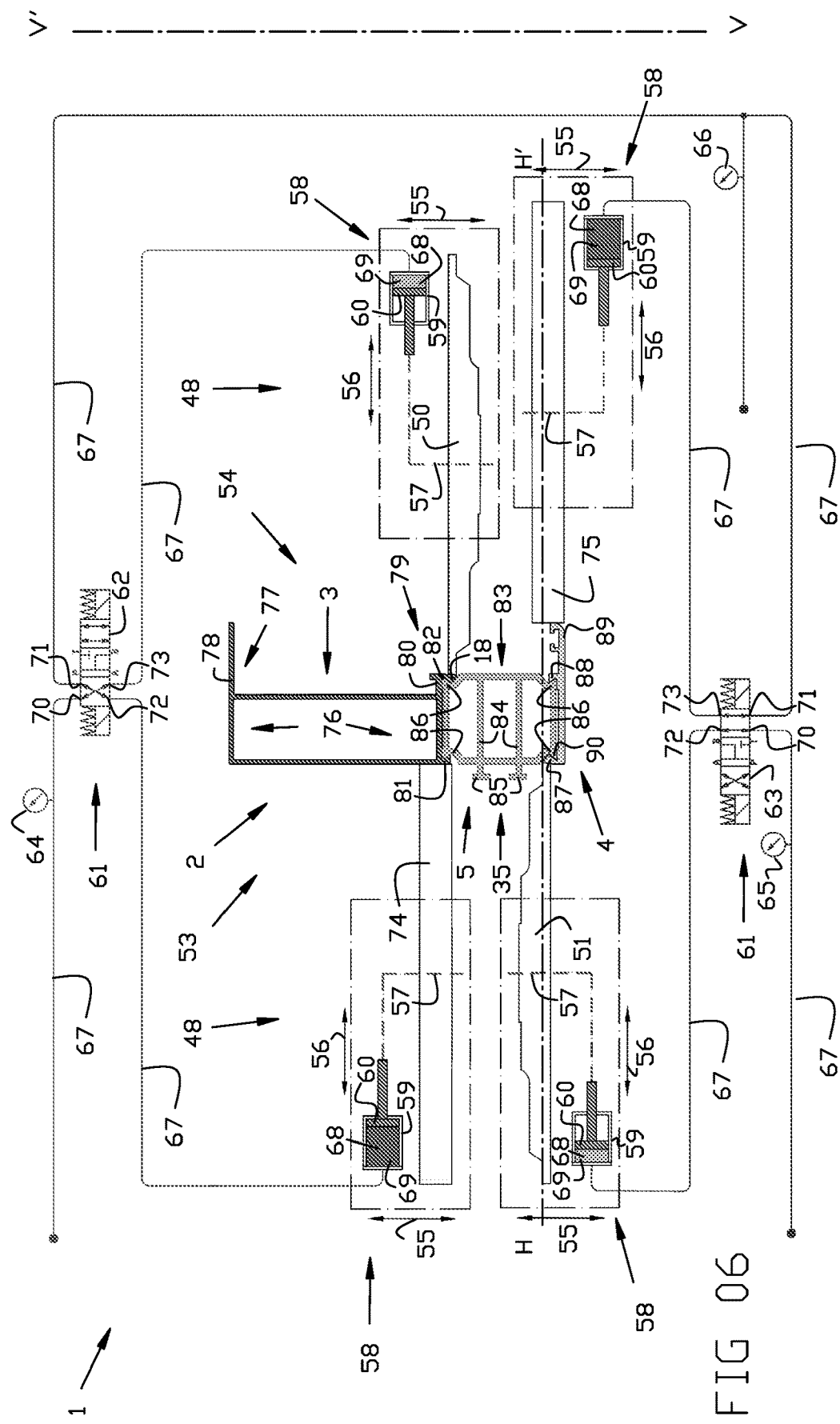

FIG. 6 represents the same machine 1 according to the invention as in FIG. 1, but in a different configuration so as to be able to assemble another type of profile 2.

According to the invention, a machine 1 in correspondence with the invention can preferably be re-configured in several different configurations, for example by automatically or manually applying or removing press tools 48, by changing the type of press tool 48 or by repositioning it.

In the case of FIG. 6, the reconfiguration consist in that two of the pressure discs 49 and 52 have each been replaced by a support section, more specifically a support section 74 and a support section 75.

Such a support section 74 of 75 is merely designed to offer support to profile sections 3 or 4 of a profile 2 to be assembled without any plastic deformation having to be achieved at the contact between said support section 74 or and the related profile section 3 or 4 in order to establish a connection.

In short, such support sections 74 or 75 absorb forces exerted on other portions of the profile sections 3 or 4 and merely provide for a good positioning of the profile sections 3 or 4 during the assembly.

Nevertheless, according to the invention, these support sections 74 and 75 remain arranged such that they can move during the rolling operation, since they were not permanently mounted on the machine 1.

Figure 7:
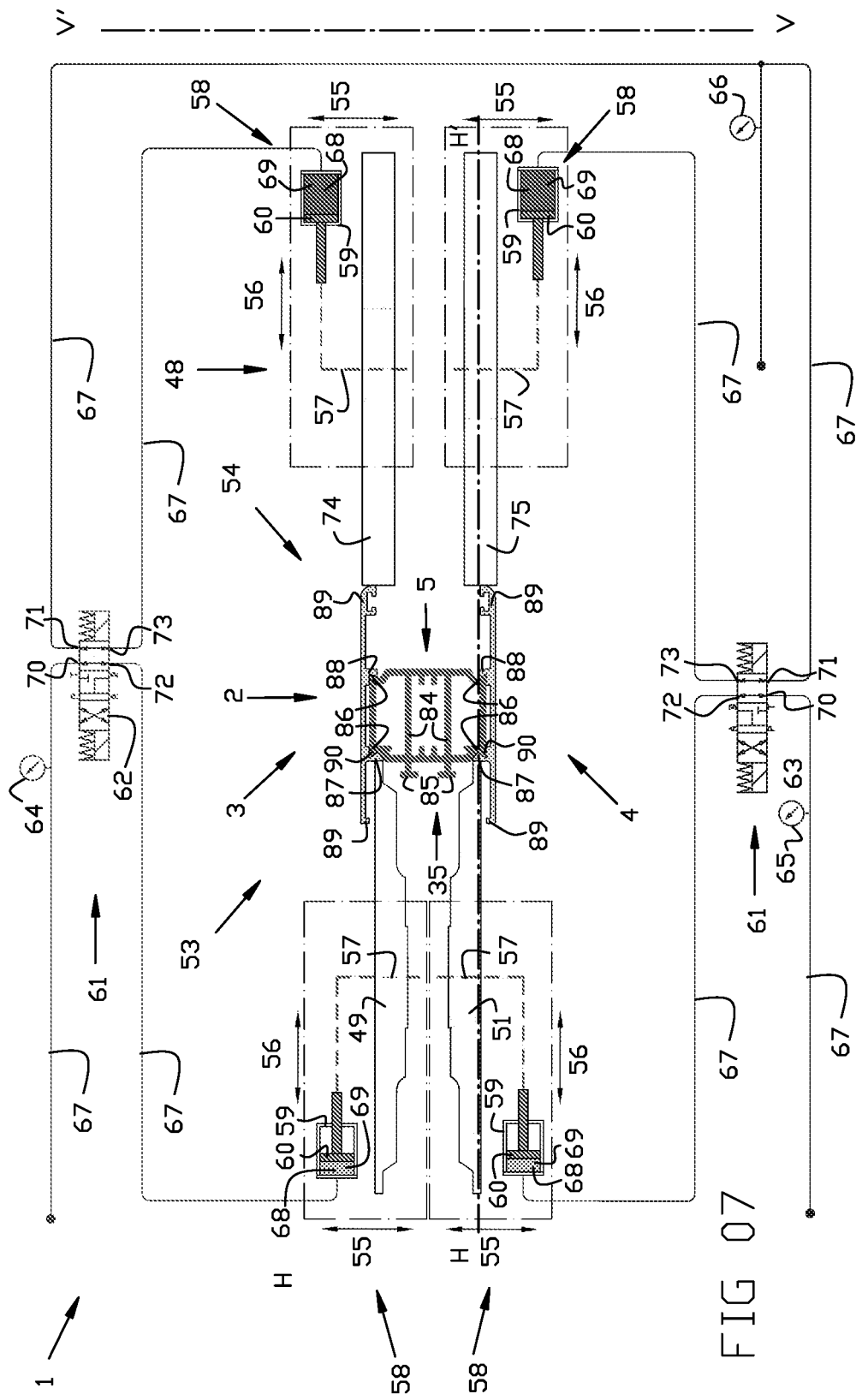

Combined with the switching means 61 this is a very advantageous arrangement, since it is easy to switch between a configuration of the machine 1 as shown in FIG. 1 and another configuration of the machine 1 as shown for example in FIGS. 6 and 7 without any press tools 48 having to be fixedly mounted in the machine 1.

This also has for a result that the reconfiguration of the machine 1 can be automated relatively easily and that such a machine 1 according to the invention is much more efficient than the known machines.

In the case of the configuration represented in FIG. 6, a first profile section 3 is tubular with a rectangular cross-section 76, provided on one side 77 with a wing 78, whereas a number of edges 80 and 81 are provided on the opposite side 79.

The edges 80 define a groove 82 with walls 18 which are plastically deformed during the assembly to realise a connection with a thermally insulating section 5.

In the case of FIG. 6, there is only one thermally insulating section 5 or intermediate section 5. Hence the term "single" or "mono" section connection.

The thermally insulating section 5 is also tubular with a predominantly rectangular, symmetrical cross-section 83 embodied with a number of inner partitions 84 and, on the outer side, a number of edges 85.

The angles of the thermally insulating section 5 are grooved so as to form edges 86, such that they fit between the edges 80 and 81 on the first profile section 3 on the one hand, as well as between the edges 87 and 88 on the second profile section 4 on the other hand.

The second profile section 4 is a predominantly flat profile section 4 with a pair of teeth directed towards one another and formed by the edges 87 and 88, and with a toothed free edge 89 on the other hand.

The edge 87 also forms a groove 90 which is to be plastically deformed during the assembly.

In the configuration of FIG. 6, the press tools 48 are again placed in pairs opposite one another on either side 53 and 54 of the profile 2 to be assembled.

More specifically, the support section 74 is set right opposite the pressure disc 50 and at the same vertical height as the pressure disc 50.

Further, the support section 75 is placed right in front of the pressure disc 51, also at the same vertical height. The support sections 74 and 75, as well as the pressure discs 50 and 51 are hereby arranged crosswise.

More specifically, a first press tool 50 is arranged on a first side 54 of the profile 2 for forming the walls 18 of the groove 82 in the first profile section 3, whereas a second press tool 51 is arranged on the opposite side 53 of the profile 2 for the deformation of the walls 18 of the groove 90 in the second profile section 4.

The aim is that, in this arrangement, the pressure discs 50 and 51 are subjected to the same adjustable outlet pressure, whereas the support discs 74 and 75 are maintained with the same maximum outlet pressure at a fixed distance from the central axis of the profile 2 to be made.

To this end, the proportional valves 62 and 63 of the machine 1 are put in a second switch position, whereby in this second switch position the pressure connection 70, the tank connection 71 are cross-linked to the cylinder connections, more specifically to the cylinder connection 73 and the cylinder connection 72 respectively.

The force transmitters 59 and 60 driving the shafts 57 of the support sections 74 and 75 are subjected to a maximum outlet pressure supplied by the hydraulic pump 66.

The pistons 60 hereby end up in the end position, such that the cylinders 59 form a sort of stop against which this maximum outlet pressure abuts, such that the support sections 74 and 75 are being firmly held in the required position.

In a way, the support sections 74 and 75 are thus held in a fixed position, at least as long as no counterforce is being exerted which does not exceed the maximum force supplied by the pump 66.

In this manner, also profiles 2 which are difficult to assemble can be composed with a machine 1 according to the invention thanks to a simple reconfiguration.

FIG. 7 represents the machine 1 according to the invention once more, this time reconfigured in yet another configuration.

The thermally insulating section 5 is entirely similar to that in FIG. 6.

This time, the thermally insulating section 5 has to be clamped between a first profile section 3 and a second profile section 4 which are entirely identical and which are provided on the top side and the bottom side of the thermally insulating section 5.

The first profile section 3 and the second profile section are hereby similar to the second profile section 4 of FIG. 7, save that this time the predominantly planar profile sections 3 and 4 are provided with a toothed free edge 89 on both side edges.

In the case of FIG. 7, the machine is arranged entirely symmetrically.

Grooves 90 on one side 53 of the profile 2 hereby need to be plastically deformed by means of pressure discs 49 and in order to clamp the corresponding edges 86 to the thermally insulating section 5.

There is a difference with the arrangement of FIG. 7 in that the pressure discs 49 and 51 and the support sections 45 and 75 are not arranged crosswise this time, but in that the pressure discs 49 and 51 are both arranged on the side 53 of the profile 2 to be assembled, whereas the support sections 74 and 75 are both arranged on the side 54 of the profile 2 to be assembled.

The proportional valves 62 and 63 are hereby switched in a third switch position, such that the press tools 48 which are arranged on one and the same side 53 or 54 of a profile 2 to be formed can be subjected to the same adjustable outlet pressure or to a fixed maximum outlet pressure.

In this third switch position, the pressure connection 70 and the tank connection 71 are coupled directly to the cylinder connections, more specifically to the cylinder connection 72 and the cylinder connection 73 respectively.

It is clear that such an arrangement does not essentially change anything to the operation of the machine 1, and that the grooves 90 can once more be plastically deformed by means of an adjustable force.

However, the different configurations of the machine 1 show that the machine can very easily be adjusted to different types of possible profile sections 3 and 4 and thermally insulating sections 5 and 6, whereby the height and horizontal position of the press tools 48 can be set in a simple manner, and more or less support sections 74 and 75 or pressure discs 49 to 52 can be applied.

Of course, many other types of press tools 48 or switching means 61 can be applied according to the invention.

The invention is by no means restricted to the embodiment of a machine 1 for the assembly of profiles 2 according to the invention, illustrated in the figures and described by way of example; on the contrary, such a machine 1 can be made in many different ways while still remaining within the scope of the invention.

Nor is the invention restricted to the described examples of methods according to the invention for the assembly of profiles 2; also other methods can be applied while still remaining within the scope of the invention.

The invention claimed is:

1. Apparatus comprising,
a machine (1) for assembly of profiles (2) which are formed of at least a first profile section (3) and a second profile section (4) which are connected by thermally insulating sections (5, 6),
whereby edges (38, 39, 45, 46, 86) of the thermally insulating sections (5, 6) are provided in grooves (17, 20, 31, 33, 82, 90) of the profile sections (3, 4),
whereby the machine (1) is provided with press tools (48) that deform walls of the grooves (17, 20, 31, 33, 82, 90) of the profile sections (3, 4) to plastically deform one or several walls (18) of the grooves (17, 20, 31, 33, 82, 90) by pressing the press tools (48), to achieve a clamping of the thermally insulating sections (5, 6) in the grooves and thus a connection between the profile sections (3, 4),
whereby the press tools (48) are provided on one or several trolleys which can move to and fro along the profile sections (3, 4) to be assembled, and
wherein the trolley or trolleys are configured such that, during a forward movement of the trolley or trolleys the grooves (17, 20, 31, 33, 82, 90) are first roughened and the thermally insulating sections (5, 6) are provided in the grooves (17, 20, 31, 33, 82, 90), and such that during a return movement of the trolley or trolleys the grooves (17, 20, 31, 33, 82, 90) are plastically deformed by means of the press tools (48) to connect the profile sections (3, 4),
wherein the press tools (48) are configured in at least two pairs on (49-50, 51-52) on opposite sides of one of the profile sections (3, 4) to be assembled,
wherein the press tools (48) are arranged to move in a lateral direction (HH') at right angles to a longitudinal direction of the profile (2) to be formed during the pressing,
wherein the machine (1) is provided with press means (58), said press means (58) being adapted for exerting an adjustable pressure on the at least two pairs (49-50, 51-52) of the press tools (48) on either side of the profile sections (3, 4) to be assembled in a horizontal lateral direction (HH') and towards the profile sections (3, 4) to be assembled to exert an adjustable force on the corresponding walls (18) of the grooves (17, 20, 31, 33, 82, 90),
wherein the press tools (48) are adapted to be positioned in relation to a central axis of the profile (2) defined by a local shape of the profile sections (3, 4) such that a constant force is continuously exerted on each of the respective walls (18) of the grooves (17, 20, 31, 33, 82, 90) of the profile sections (3, 4) of the profile (2), irrespective of small deviations in the shape of the profile sections (3, 4) within certain tolerance limits, wherein the press means (58) are adapted for exerting an adjustable force on the press tools (48) on each side of the profile sections (3, 4) to be assembled, and wherein the adjustable force is independently adjustable for each of the press tools of said at least two such pair of press tools (49-50, 51-52), whereby a first pair of the at least two pairs of the press tools are situated opposite one another on two opposite sides (53, 54) of the first profile section (3), whereas a second pair of the at least two pairs of the press tools are placed opposite one another at a certain distance from the first pair in the longitudinal direction of the profile (2) to be formed, also on opposite sides (53, 54) of the second profile section (4), and wherein the press means (58) is configured to provide the force for plastically deforming the walls (18) of the grooves (17, 20, 82) of the first profile section (3) independently of the force for deforming the walls (18) of the grooves (31, 33, 90) of the second profile section (4).

2. Apparatus comprising, a machine (1) according to claim 1, wherein the press means (58) are of the hydraulic, the pneumatic or the electric type or a combination thereof.

3. Apparatus comprising, a machine (1) according to claim 1, wherein each of the press tools (48) are formed of a press roll, a pressure disc (49-52) or a support section (74, 75).

4. Apparatus comprising, a machine (1) according to claim 1, wherein the machine (1) is configured for several different configurations by automatically or manually applying or removing press tools (48), by changing the type of press tool (48) or by repositioning the press tools.

5. Apparatus comprising, a machine (1) according to claim 1, wherein the press means are provided with switching means (61) configured to permit the press tools (48) on opposite sides (53, 54) of the profile sections (3, 4), in which the press tools are in a shape of a press roll or pressure disc (49-52), to be subjected to a same adjustable pressure.

6. Apparatus comprising, a machine (1) according to claim 1, wherein the press tools (48) of the at least two pair are arranged crosswise on opposite sides (53, 54) of the profile (2) to be formed, a first press tool (50) on a first side (54) of the profile (2) for deforming the walls (18) of a groove (82) in a first profile section (3) and a second press tool (51) on the opposite side (53) of the profile (2) for deforming the walls (18) of a groove (90) in a second profile section (4), and wherein the press means (58) are provided with switching means (61) configured to permit the press tools to be subjected to a same adjustable outlet pressure or to a fixed maximum outlet pressure.

7. Apparatus comprising, a machine (1) according to claim 1, wherein the press means (58) are provided with switching means (61) configured to permit the press tools (48) which are arranged on one side (53, 54) of the profile (2) to be formed to be subjected to a same adjustable outlet pressure or to a fixed maximum outlet pressure.

8. Apparatus comprising, a machine (1) according to claim 1, wherein the press tools are adjustable in height in a direction (W) standing at right angles to the lateral direction (HH') and at right angles to the longitudinal direction of the profiles (2).

9. Apparatus comprising, a machine (1) according to claim 8, wherein carriers or pusher elements are provided on the one or several trolleys which can move to and fro along the profile sections (3, 4) to be assembled.

10. Method for forming of profiles (2), the method comprising:

providing at least a first profile section (3), a second profile section (4), and thermally insulating sections (5, 6);

providing a machine (1) with press tools (48) on trolleys which are configured to move forward and return along profile sections (3, 4) to be assembled, situating the press tools (49, 50) of a first pair of the press tools (48) opposite one another on two opposite sides (53, 54) of the first profile section (3);

placing the press tools (51, 52) of a second pair of the press tools (48) opposite one another at a certain distance thereof in a longitudinal direction of the profile (2) to be formed, also on opposite sides (53, 54) of the second profile section (4);

and wherein the press tools (48) of first and second pair (49-50, 51-52) of the press tools (48) are arranged such that they can move in a lateral direction (HH') at right angles to the longitudinal direction of at least one of the profiles (2) to be formed during pressing or rolling;

during a forward movement of the trolley or trolleys, first roughening the grooves (17, 20, 31, 33, 82, 90) and subsequently disposing edges (38, 39, 45, 46, 86) of the thermally insulating sections (5, 6) in grooves (17, 20, 31, 33, 82, 90) of the profile sections (3, 4) and then during a return movement of the trolley or trolleys, plastically deforming walls of the grooves (17, 20, 31, 33, 82, 90) by moving the press tools (48) by means of pressing or rolling, thereby connecting the profiles by:

exerting an adjustable pressure on the press tools (48) of the at least one pair (49-50, 51-52) of the press tools with press means (58), exerting an adjustable force on the press tools (48) of the at least one pair of the press tools (49-50, 51-52) on each side of one of the profile sections (3, 4), adjusting and controlling the adjustable force on the related press tools (48) at the grooves (17, 20, 31, 33, 82, 90) of the profile sections (3, 4) by separately adjusting the adjustable force for each of the press tools (48) of said at least one such pair of press tools (49-50, 51-52), the press means (58) providing the adjustable force, exerting a constant force continuously on each of the respective walls (18) of the grooves (17, 20, 31, 33, 82, 90) of the profile sections (3, 4) irrespective of small deviations in the shape of the profile sections (3, 4) due to differences within certain tolerance limits the press means (58);

plastically deforming one or several walls (18) of the grooves (17, 20, 31, 33, 82, 90), thereby constantly self-positioning the press tools (48) in relation to a central axis of the connection between the profile sections, as such deforming the walls under the influence of a local shape of the profile sections (3, 4) and deforming the walls (18) of the grooves (17, 20, 82) of the first profile section (3) independently of the force for deforming the walls (18) of the grooves (31, 33, 90) of the second profile section (4); and thereby clamping the thermally insulating sections (5, 6) in the grooves (17, 20, 31, 33, 82, 90) and thus creating the connection between the profile sections (3, 4) and joining the profile sections (2, 3) to the thermally insulating sections (5, 6).

11. Method according to claim 10, further comprising moving the press tools (48) of the first and second pair of press tools over the length of the profile sections (3, 4) to be assembled, providing the thermally insulating sections (5, 6) in the grooves (17, 20, 31, 33, 82, 90) during the forward movement of the press tools; and exerting adjustable and controlled force at heights of the grooves (17, 20, 31, 33, 82, 90) during the return movement of the press tools.

* * * * *